United States Patent
Banerjee

(10) Patent No.: US 6,724,845 B1
(45) Date of Patent: Apr. 20, 2004

(54) MODIFIED FILTERING FOR ASYNCHRONOUS INPUTS

(75) Inventor: Debarag Narayan Banerjee, Milpitas, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 666 days.

(21) Appl. No.: 09/640,128

(22) Filed: Aug. 16, 2000

(51) Int. Cl.$^7$ .................................................. H04B 1/10

(52) U.S. Cl. ..................... 375/350; 375/285; 370/342

(58) Field of Search ................................. 375/130, 140, 375/147, 143, 152, 316, 346, 350, 229, 230, 232, 285, 348, 349, 355; 370/335, 342, 500

(56) References Cited

U.S. PATENT DOCUMENTS

| | | | | |
|---|---|---|---|---|
| 5,245,647 A | * | 9/1993 | Grouffal et al. | ............... 377/20 |
| 6,421,380 B1 | * | 7/2002 | Gu et al. | ..................... 375/232 |
| 6,539,069 B1 | * | 3/2003 | Hughes | ...................... 375/350 |

OTHER PUBLICATIONS

T. Dohi et al., "Performance of SIR Based Power Control in the Presence of Non–uniform Traffic Distribution", 1995 Fourth Annual IEEE International Conference on Universal Personal Communicatons Record, pp. 334–338, Nov. 1995.

* cited by examiner

*Primary Examiner*—Jean B. Corrielus
(74) *Attorney, Agent, or Firm*—Peter Zawilski

(57) ABSTRACT

For use in a digital signal processing system, a filter implementation factors in the time difference between consecutive searches for the same signal and modifies the filter depending on the time-arrival differences of consecutive search results. An example application to which the invention is particularly well adapted is in a mobile receiver for a cellular radiotelephone communications system. In accordance with the present invention, after determining a relative arrival time of data sample sets in the stream of data samples, the mobile station includes a receiver arrangement configured to filter a stream of data samples arriving at irregular intervals, to provide a relative arrival time of data sample sets in the stream of data samples, and in response to determining the relative arrival time, to filter the data sample sets using value assignments that are exponentially weighted for the data sample sets. The data sample sets are weighted more than data sample sets arriving early. In a more specific implementation, the receiver arrangement searches the data sample sets for a signal strength signal, and filters the data sample sets based on time-arrival differences of consecutive search results.

23 Claims, 4 Drawing Sheets

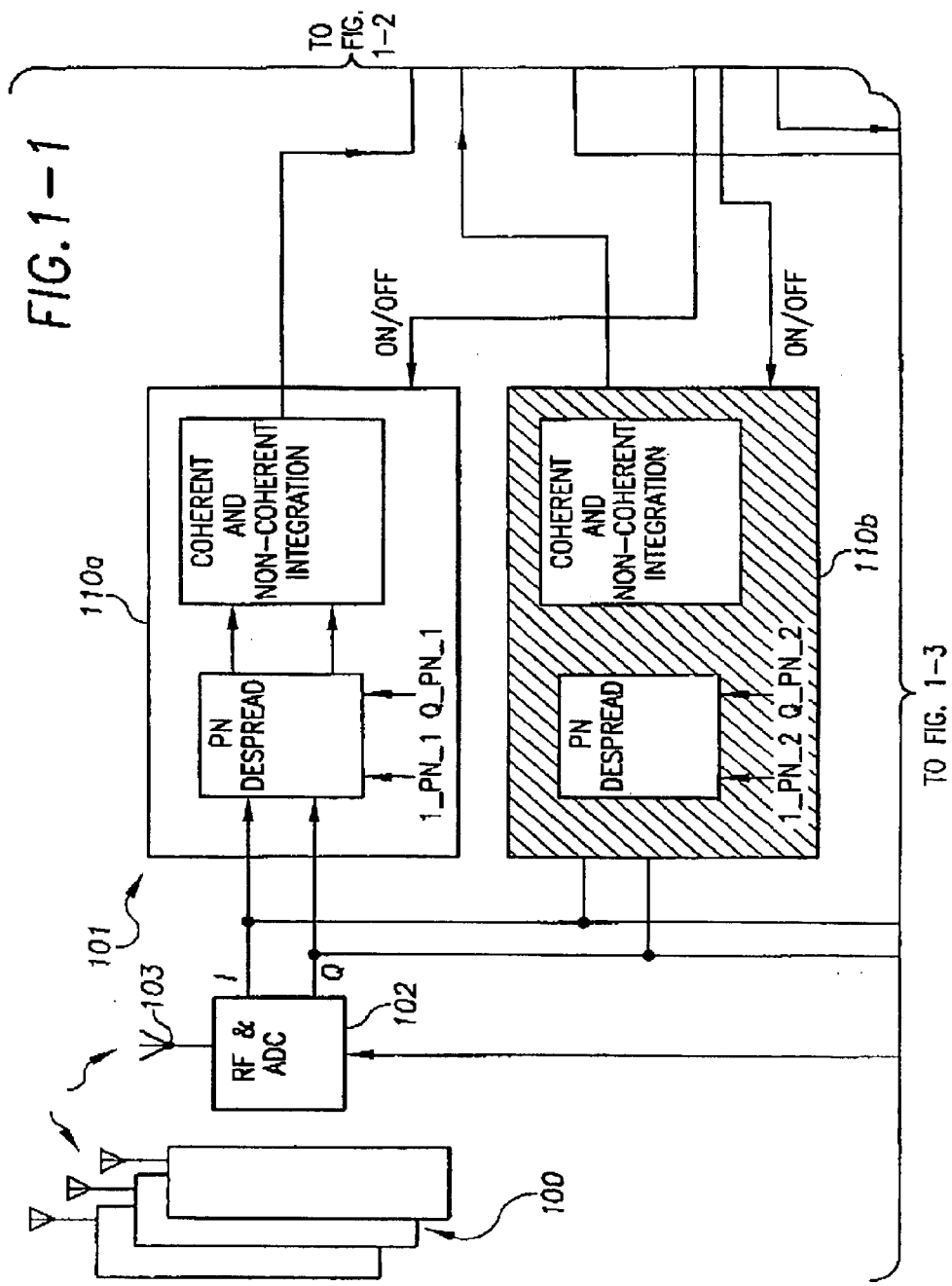

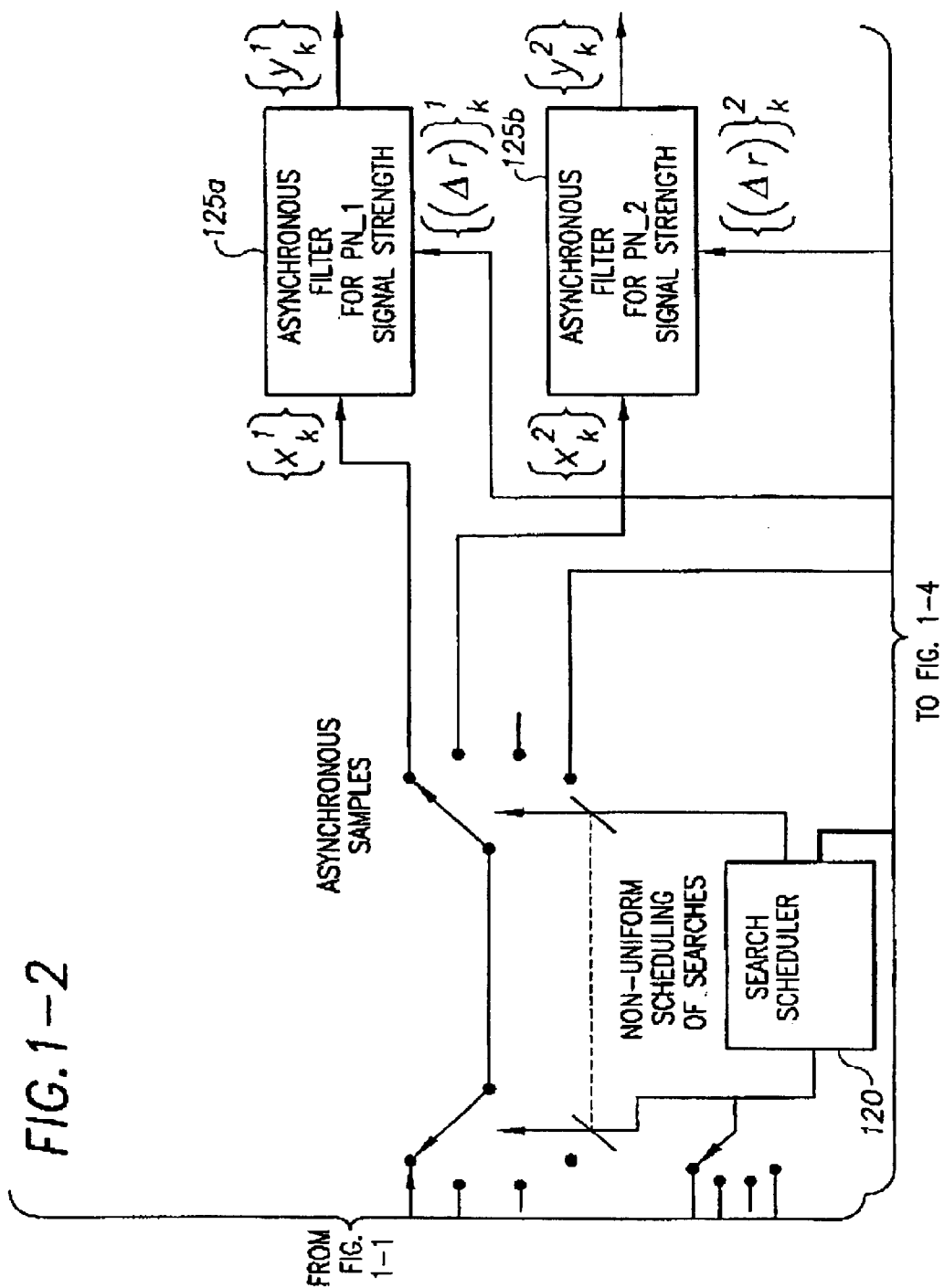

MODIFIED FILTERING FOR ASYNCHRONOUS INPUTS

FIELD OF THE INVENTION

The present invention relates generally to processing of data signals. A specific application of the present invention relates to data signal processing involving filtering of asynchronously received data samples. The present invention has application, for example, as part of a radio receiver using digital signal processing circuitry to filter data samples corresponding to signal strength estimates having irregularly timed estimations, where the irregularly timed estimations correspond to the asynchronously received data samples.

BACKGROUND OF THE INVENTION

Large-user radio communication systems have been developed into a complex inter-networked web of systems deployed to provide coverage internationally. Examples of such systems include cellular radio communication systems and other wireless systems such as wireless LANs. A cellular radio communication system includes multiple communication cells arranged adjacent one another to cover a larger regional area. Each cell limits the number of possible simultaneous communications to the number of channels provided in the cell. The size of the cell is defined through receivers and transmitters (a.k.a., "transceivers") located within base stations that provide the communication channels through which the mobile radios communicate. A mobile radio communicates in a cellular system by communicating first with a number of close-proximity base stations before selecting the best or nearest base station with which to establish a radio communication link.

In providing a clear channel between the mobile radio and the selected base station, the prevention of interference from and to other radio communication links is an important concern. Generally, this concern is addressed through the use of an accurate method for determining with the nearest base station and by controlling the transmission power levels used in maintaining the communication. If the nearest base station is not accurately selected or changes without a timely update, the communication can overlap and interfere with other communications in the system. Similarly, if the transmission power used in maintaining the radio link within a given cell is not properly controlled at relatively low level, the excessive transmissions can cause intolerable levels of interference. Radio designers have attempted to avoid these problems by designing the mobile radio with a receiver designed to provide precision-selective filtering of the data communicated in such systems; namely, the data communicated between each mobile radio and its surrounding base stations.

Many communication systems, including both cellular systems and the GPS, include receivers that are highly dependent on filters to accurately decipher asynchronously-received data from interference signals, including signals from other radio communication links in the same system. This issue is best explained in the context of a specific system. In cellular communication systems, for instance, the mobile stations select the nearest base station by monitoring a control channel transmitted from each base station for its signal strength and selecting the nearest base station in response to comparing these channel reception levels for the best signal quality. The transmission power is controlled at minimum levels by using algorithms at the base station and/or the mobile radio and, in some systems, also by passing control information between the base station and the mobile radio during the communication. Many of these systems use direct-sequence, spread-spectrum (DSSS) code-division-multiple-access (CDMA) communication. In this type of system, the same frequency is commonly used by a plurality of users by breaking apart the communication and transmitting using different codes. At any given frequency, the signals of other users interfere with the measurements for the signal quality of the transmitting base stations. In an attempt to account for this interference, measurement methods determine the signal quality by computing the ratio of the signal reception level and the interference level, which is known as "SIR" or Signal to Interference Ratio, as described for example, by T. Dohi, et al: "Performance of SIR Based Power Control in the Presence of Non-uniform Traffic Distribution," 1995 Fourth IEEE International Conference on Universal Personal Communications Record, pp. 334–338, November 1995. In addition to the SIR, the signal quality determination is also dependent on the estimates of the signal reception level which, in turn, is dependent on the accuracy in which these estimates are communicated, a problem known as "multi-path Rayleigh fading."

Multi-path Rayleigh fading ("fading") is caused by reflections of the signals being received from the base stations through the wireless communication medium. Communication of measured radio frequency (RF) signal strength is also subject to such fading. For cellular CDMA communication systems, the mobile station's selection of the nearest base station often consists of a search for the optimal CDMA pilot strength. This CDMA pilot strength search is subject to both fading and radio signal interference and is, therefore, particularly susceptible to error. The problem of fading is further aggravated when it is fast fading. Lingering effects of fast fading in signal search results may occur even after coherent and non-coherent integration efforts by the search process, and slower mobile speeds will aggravate this effect more than faster mobile speeds, which is opposite the effect of speed on slow fading signals as it applies to the signal searching process.

It has been determined that the adverse effects of fast fading can be overcome using one or more of the following three approaches: (1) increasing the dwell time to approximate the correlation interval for fast fading; (2) using IIR filtering to average out the effects of residual variance caused by the fading; and (3) searching more frequently to increase the probability of finding a pilot strength signal. Addressing the first of these approaches, the extent of the filter-response distortion in such approaches directly relates to the effect of the dwell time. The correlation time for fast fading is typically half a wavelength. For a 100 Hz dual dwell search, typically the coherent and non-coherent integration times are N=128 and L=16 for the first dwell. The comparison between dwell time and correlation time for different example conditions are given below.

| Band (MHz) | Speed (kmph) | Corr Time (sec) | N*L | Dwell Time (sec) | Dwell/Corr |
|---|---|---|---|---|---|
| 800 | 8 | 0.16875 | 2048 | 0.05333333 | 0.316049 |
| 800 | 30 | 0.045 | 2048 | 0.05333333 | 1.185185 |
| 800 | 100 | 0.0135 | 2048 | 0.05333333 | 3.950617 |
| 1900 | 8 | 0.071053 | 2048 | 0.05333333 | 0.750617 |
| 1900 | 30 | 0.018947 | 2048 | 0.05333333 | 2.814815 |
| 1900 | 100 | 0.005684 | 2048 | 0.05333333 | 9.382716 |

From these comparisons, it can be recognized that the first approach alone, increasing the dwell time to approximate the correlation interval for fast fading, would be insufficient to eliminate the effects of fast fading.

Success of the second and third approaches depends on the effectiveness of the filtering for the particular application at hand. Using the cellular communication system as the target application, the purpose of an idle handoff from one cell to another cell is to provide for the demodulation of stronger pilots signals based on large scale effects like shadowing, while eliminating small scale effects like fast fading. To achieve this, multiple search results within a shadowing correlation time would need to be averaged, while results separated by more than the shadowing correlation time would need to be kept relatively uncorrelated. In connection with the present invention, two approaches have been considered for operation on the time series of consecutive search results to obtain this desired result. The first possibility is to not perform the conventional filtering function. If the search dwell time is significantly higher than the fast fading correlation time, then no further filtering would be needed to achieve the desired averaging of fast fading. However, as can be seen in the above table, the dwell time is typically smaller than the correlation time for fast fading for the 8 kmph cases, typically about the same for the 30 kmph cases, and typically bigger for 100 kmph cases. Hence, the variance due to fading would not be eliminated at this value of dwell time under all fading conditions.

A second possibility is to perform conventional IIR filtering. This method is commonly used in cellular systems for traffic channel search results. Generally, the operation uses a running average of the search results with a certain forgetting factor, which is tantamount to a single pole IIR filter with the appropriate time constant being somewhere between the slow and fast fading correlation times. One potential problem with implementing this filter is in the idle mode, in that the samples would not generally be available in regular intervals; that is, the sampling frequency would dynamically vary based on several factors, including the total number of searches to be performed, search priority, and search window sizes. Moreover, a conventional IIR filter treats a sample arriving relatively quickly the same as a sample arriving relatively late, even though the earlier arriving sample should have more current information. By treating these timed-offset samples equally, the effective time constant the filter used by the filter becomes distorted, thereby distorting the filter's response.

Accordingly, there is a need for an improved approach to asynchronous signal processing in such communication systems.

SUMMARY

According to various aspects of the present invention, embodiments thereof are exemplified in the form of methods and arrangements involving a filter implementation that factors in the time difference between consecutive searches for the same signal. Such an implementation modifies the coefficients of the filter depending on the time-arrival differences of consecutive search results.

According to the present invention, one example application of such an implementation is directed to single pole filter. Since the impulse response of an ideal single pole filter is exponentially decaying, the implementation varies the forgetting factor in an exponentially decaying fashion with respect to the time difference between consecutive searches.

Another example application of the present invention is directed to a method for filtering a stream of data samples arriving asynchronously, i.e., at irregular intervals. In accordance with the present invention, after determining a relative arrival time of data sample sets in the stream of data samples, the method filters the data sample sets using value assignments that are exponentially weighted for the data sample sets, the data sample sets being weighted more than data sample sets arriving late.

A more particular aspect of the present invention is directed to a specific CDMA cellular application. In this application, a communications system includes a mobile station communicating with a plurality of base stations. The pilot search results are processed in the mobile station's receiver to provide asynchronous samples of the search results for each PN code. These asynchronous samples are processed in respective filters by a filtering process which provide a relative arrival time of data sample sets in the stream of data samples and filters the data sample sets using value assignments that are exponentially weighted. The data sample sets are weighted more than data sample sets arriving late. The filtered search results are then processed conventionally in connection with a handoff between base stations. In a more specific implementation, the receiver arrangement includes a digital signal processor programmed and arranged to filter the sample data sets.

The above summary is not intended to provide an overview of all aspects of the present invention. Other aspects of the present invention are exemplified and described in connection with the detailed description.

BRIEF DESCRIPTION OF THE DRAWINGS

Various aspects and advantages of the present invention will become apparent upon reading the following detailed description of various embodiments and upon reference to the drawings in which.

Figures 1, 2, 3:
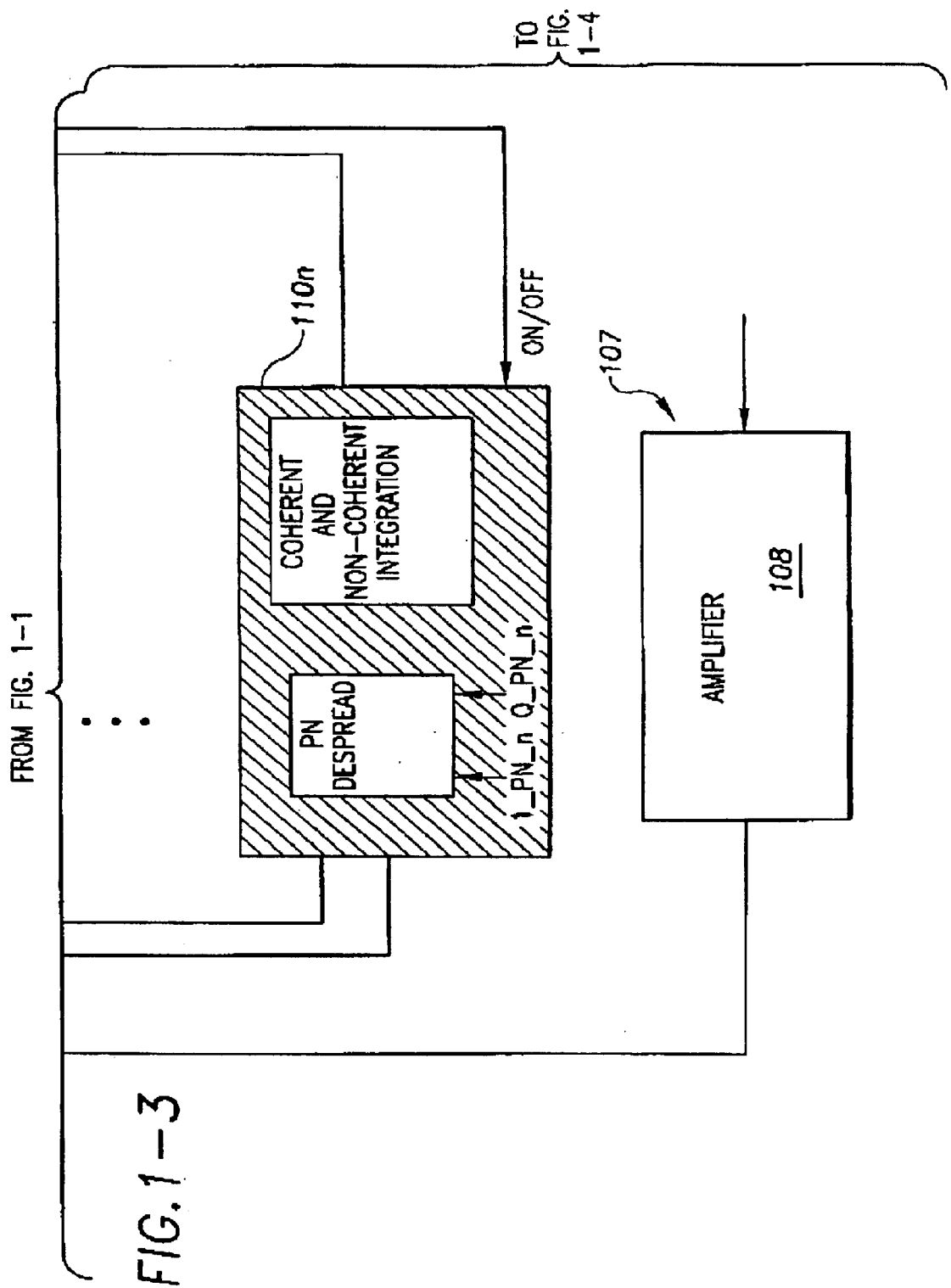
FIG. 1 is a logical block diagram of a spread spectrum communication device, according to an example embodiment and specific example application of the present invention.
Figures 1, 2, 3, 4:
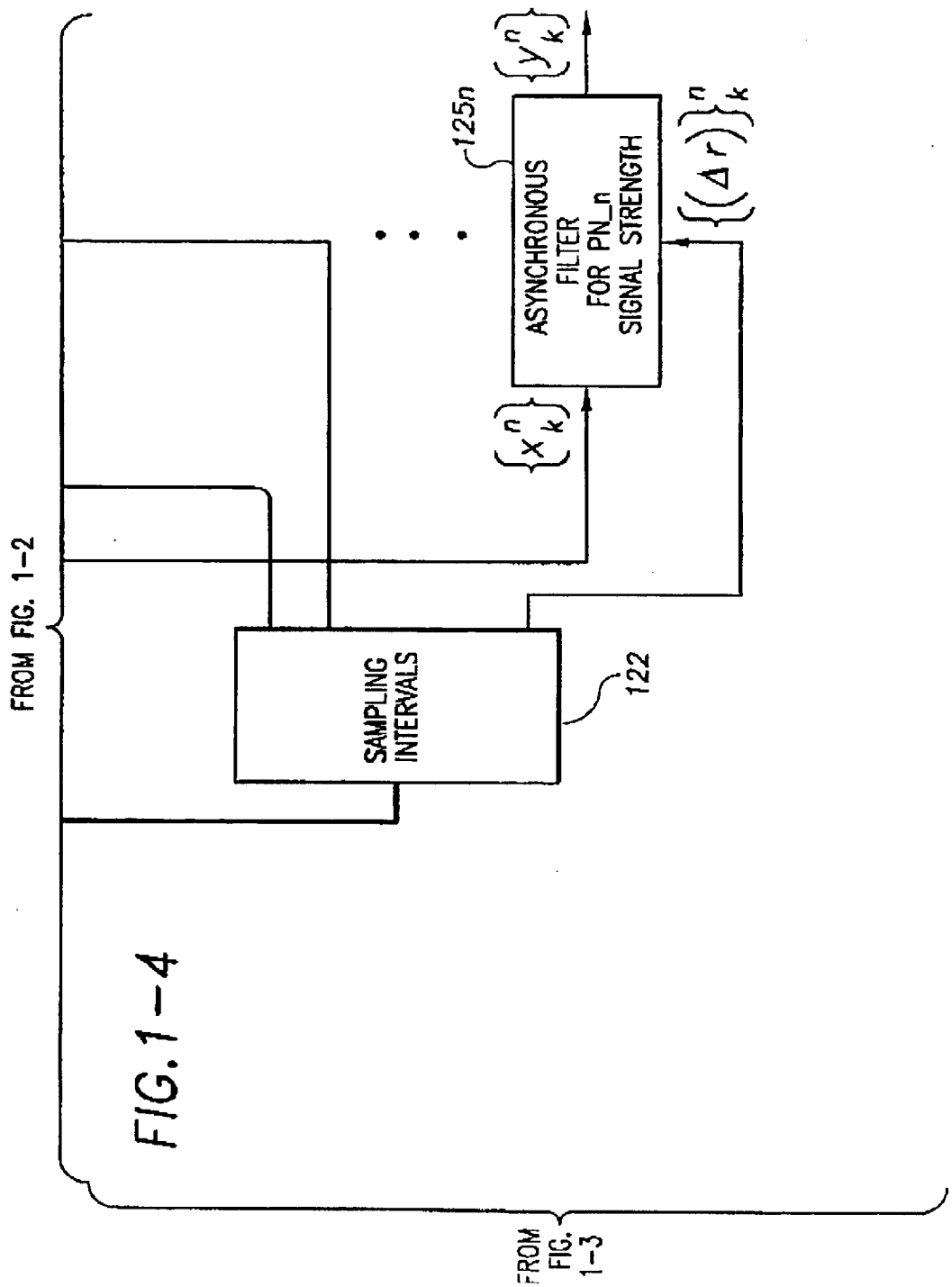

While the invention is amenable to various modifications and alternative forms, specifics thereof have been shown by way of example in the drawings and will be described in detail. It should be understood, however, that the intention is not to limit the invention to any particular embodiment described. On the contrary, the intention invention is to cover all modifications, equivalents, and alternatives falling within the spirit and scope of the invention as defined by the appended claims.

DETAILED DESCRIPTION

The present invention has a variety of applications to asynchronous data reception and has been found to be particularly advantageous for use in connection with radio communication receivers susceptible to erroneous data interpretations due to sampling data at irregular intervals. A specific example application benefiting from implementations of the present invention includes pilot signal strength searches in cellular communication systems. While the present invention is not necessarily limited to such applications, various aspects of the invention can be appreciated through a discussion of example embodiments implemented in this context.

According to one example embodiment, the present invention is directed to a radio receiver including a data processing arrangement programmed to process a stream of data samples that arrive asynchronously. In accordance with the present invention, after determining a relative arrival time of data sample sets in the stream of data samples, the data processing arrangement filters the data sample sets using value assignments that are exponentially weighted for the data sample sets, the data sample sets being weighted more than data sample sets arriving late. This value assignment is fully appreciated when considering it as applied, for example, to a single pole filter which has an impulse response that is exponentially decaying. According to the present invention, the implementation varies the forgetting factor in an exponentially decaying fashion with respect to the time difference between consecutive searches for a selected signal in the data sample sets.

The present invention is also particularly well adapted for use in a CDMA cellular communications system in connection with a mobile receiver's pilot signal strength search. After determining a relative arrival time of data sample sets in the stream of data samples, the mobile station's receiver filters a stream of pilot signal data samples arriving at irregular intervals, provides a relative arrival time of data sample sets in the stream of data samples between searches, and in response to determining the relative arrival time, filters the data sample sets using value assignments that are exponentially weighted for the data sample sets. The data sample sets are weighted more than data sample sets arriving late. In many implementations, although not necessary, these logical blocks of the mobile station's receiver are implemented in the form of a programmed digital signal processing arrangement including at least one digital signal processor specially designed for filtering.

These various embodiments are best understood in connection with a specific example application, such as the CDMA communication system illustrated in FIG. 1. The system includes a plurality of base stations 100 communicating with a CDMA communication device 101, the receiver portion of which is shown. The CDMA communication device 101 is adapted to perform the data processing operation described above for the DSSS CDMA cellular system. In this example application, a symbol to be transmitted to the CDMA communication device 101 is spread by a pseudo-noise (PN) reference sequence with a chip rate that is substantially greater than a symbol rate of the signal, so as to form a spread spectrum signal. Such a spread spectrum signal is modulated onto a carrier for transmission as described, for example, in TIA/EIA Interim Standard TIA/EIA/IS-95-A.

The CDMA communication device 101 receives a modulated spread spectrum signal s(t). In the communication device 101, received multipath components of the transmitted modulated spread spectrum signal s(t) are resolved at sub-chip resolution. The communication device 101 includes a receiver front-end 102 coupled to an antenna 103 receiving the modulated spread spectrum signal s(t). The front end 102 filters and amplifies the received signal s(t) and carrier-demodulates the received signal s(t) as is conventional. The communication device 101 can be a unidirectional device only receiving the signal s(t), or as in most applications, the device 101 is a bi-directional communication device including, among other blocks in a transmitter branch 107, a power amplifier 108. The transmitter branch 107 is adapted to generate a spread spectrum signal as described in the above-mentioned TIA/EIA Interim Standard document.

The receiver front-end 102 provides a demodulated spread spectrum signal in the form of quadrature base band samples sI(nTs) and sQ(nTs) from internally-produced quadrature base band signals sI(t) and sQ(t), t being time, n being an integer, and "1/Ts" being a sampling rate exceeding the chip rate of the received signal s(t). The device 101 retrieves the symbols or the bits intended for it by correlating the samples with a locally generated pseudo-noise ("PN") sequence which is the same as the PN reference with which the symbol was transmitted. Thus, for each PN sequence, the communication device 101 performs decoding functions including PN despreading and coherent and noncoherent signals as indicated generally at blocks 110a, 110b through block 110n and, more specifically, within each such block in corresponding subblocks (e.g., blocks 112a and 114a for block 110a).

For conducting the pilot signal search, the communication device 101 further includes a search scheduler 120 that is adapted to selectively schedule the searching for samples of a pilot signal for each PN sequence. This scheduling, which is logically depicted using the "on/off" inputs to each decoding block 110a through 110n, is performed on a nonuniform basis to accommodate the dynamic nature of the search requirements of the pilots being received and searched. In one specific application, the pilots are searched in a sequence that schedules consecutive searches of the same pilot at different search intervals. This can occur due to variety of reasons:

1. Some of the pilots in a search set may have enough strength to be candidates for a dual dwell search (i.e. the same pilot searched twice) in one of its search instances. In such a case, the search time interval for the other pilots vary as well. For example, for the pilots A, B, C, let the search sequence be ABCABB'CABC. Here B went through a dual dwell search (BB') in the second search instant. If the time interval between each search is $\tau$, the time between the $1^{st}$ and the $2^{nd}$ search of A and C are $3\tau$ and $4\tau$, respectively; while the time between the $2^{nd}$ and $3^{rd}$ search of the same pilots A and C are $4\tau$ and $3\tau$, respectively. So, the search outputs of A and C are effectively asynchronously sampled.

2. The original schedule of the searches for different pilots need not be uniform. This may be due to different search rate requirements due to different priorities assigned to each search. For example, if A has higher priority than B, which has higher priority than C and D, a typical search schedule may be ABADACBABA-DACB (the derivation of this sequence is beyond the scope of this patent). In that case, the time interval between the consecutive searches for A, B, C and D will be $\{2\tau, 2\tau, 3\tau, 2\tau, 2\tau, \{5\tau, 2\tau\}, \{7\tau\}$ and $\{7\tau\}$ respectively. So clearly, the search outputs of A and B will be asynchronously sampled.

From the decoding blocks 110a through 110n, results of the search for the respective pilot signals are respectively processed by filters 125a, 125b through 125n, in a manner consistent with the filter embodiments described above. As depicted in connection with block 122, the search scheduler 120 generates the sampling intervals as used by each such filter to factor in the time difference between consecutive searches for the pilot strength signal. In one particular example implementation, a modified IIR filter is used with the coefficients of the IIR filter being altered depending on the time-arrival differences of the consecutive search results for each PN sequence, and the relative arrival time is determined as an approximate integral multiple of unit sample intervals for the filtering.

In many cellular applications, the set of search results provided by the outputs of the depicted filters 125a through 125n are presented to the communicatively-coupled base station to represent a set of hand-off candidates. In response, the base station determines when and where to hand-off the communication.

According to another example implementation of the present invention, the above-depicted filter 125 is a modification of a conventional IIR filter as described below, wherein the time series to be filtered x(t) is and is sampled at different time intervals $t_k$ to yield the discrete time series x(k), with y(k) being the filtered version of x(k). The modified filtering function for implementing the equivalent of a single pole filter with forgetting factor "α" corresponds to the following filtering approach for generating the consecutive samples of the time series y(k):

$$y_k = (1 - \alpha^{M_k})x_k + \alpha^{M_k} y_{k-1} \quad \text{Where, } M_k = \left\lceil \frac{\Delta t_k}{\tau} \right\rceil$$

and where the symbol, Δt, is equal to the time difference between the k-th and (k-1)-th samples or searches of x(t).

The symbol τ is the time constant (or unit sample interval) of the IIR filter. For some applications a useful value for this time constant is less than ten seconds, with the actual value being optimized empirically for example by simulation. If samples arrive at a time less than this time constant, then they will be weighted by the original weight (1−α). Also, the value of weights will be changed according to the exponential rule with every integral multiple of τ.

The symbol α is the approximate filter pole location, also known as the "forgetting factor" of the filter. The optimal value of this parameter can be determined empirically. In one application, efficient processor calculations, including "raised to the power" and the multiplier function, can be achieved by approximating a to the nearest inverse power of 2 (that is, 0.5, 0.25, etc.) and by implementing an appropriate number of bit shifts to multiply by $\alpha^M$.

The above expression corresponds to a single pole IIR filter, but the same analysis and application is applicable to multiple-pole IIR filters as well. For example, where p is the number of poles, a p-order vector Δt of time intervals is defined between consecutive samples such that:

$$\Delta t = |(t_k - t_{k-1})(t_{k-1} - t_{k-2}) \ldots (t_{k-p+1} - t_{k-p})|.$$

The filtering rule is now defined as follows:

$$y_k = \left(1 - \sum_{j=1}^{p} \alpha_j^{m_{k,j}}\right) X_k + \sum_{j=1}^{p} \alpha_j^{m_{k,j}} y_{k-j} \quad \text{Where, } M_{k,j} = \left\lceil \frac{\Delta t_{j,k}}{\tau_j} \right\rceil$$

A filter constructed in accordance with this filter expression differs from the previous single pole filter implementation in that each of the IIR coefficients may have different unit sample intervals, τ, and therefore may be sampled differently for the same Δt. This approach facilitates use of the inverse power-of-two approximation for the IIR filter coefficients.

While some of the above example embodiments discuss an IIR filter, the present invention is also equally useful when implemented with an FIR filter. In this instance, the series X(k) can be an FIR filtered version of x(k) that yields a combined IIR filter with zeroes as well as poles and thereby generalizing these filter implementations according to the present invention.

The various embodiments described above are provided by way of illustration only and are not intended to limit the invention. Those skilled in the art will readily recognize various modifications and changes that may be made to the present invention without strictly following the example embodiments and applications illustrated and described herein. The scope of the present invention is set forth in the following claims.

What is claimed is:

1. For use in a communication system, a method of filtering a stream of data samples arriving at irregular intervals, comprising:
   providing a relative arrival time of data sample sets in the stream of data samples;
   in response to providing the relative arrival time, filtering the data sample sets using value assignments that are exponentially weighted for the data sample sets, the data sample sets being weighted more than data sample sets arriving late.

2. The method of claim 1, wherein each of the data sample sets is composed of a single data sample.

3. The method of claim 2, wherein the filtering includes modifications of IIR filtering with the value assignments being weighted as a function of one or more filter coefficients.

4. The method of claim 2, wherein the filtering includes IIR filtering with the value assignments being weighted by a first weighting factor in response to determining that the data sample arrived not after a unit sample interval for the IIR filtering.

5. The method of claim 4, wherein the filtering includes IIR filtering with the value assignments being weighted by a second weighting factor in response to determining that the data sample arrived after a unit sample interval for the IIR filtering.

6. The method of claim 1, wherein providing a relative arrival time of data sample sets includes determining the relative arrival time as an approximate integral multiple of unit sample intervals for the filtering, and wherein the data sample sets correspond to a pilot signal.

7. The method of claim 6, wherein the value assignments of a data sample set is exponentially weighted by a factor that is a function of the approximate number of integral multiple of unit sample intervals corresponding to the relative arrival time of the corresponding data sample set.

8. The method of claim 1, wherein filtering the data sample sets includes filtering data samples corresponding to signal strength estimates having irregularly timed estimations, the irregularly timed estimations being performed by a station responding to signals received from each of a plurality of fixed-location radio stations.

9. The method of claim 1, wherein providing a relative arrival time of data sample sets includes determining the relative arrival time of the data sample sets.

10. For use in a mobile-service radio system having a plurality of base stations and mobile stations, a method of filtering a stream of data samples arriving at irregular intervals, comprising:
    at one of the mobile receivers, receiving an analog signal including data carried in a CDMA format, converting the analog signal to digital codes, and evaluating the digital codes to provide filter coefficients while searching for a selected signal, the filter coefficients defined as a function of time-arrival differences of consecutive search results for the selected signal using exponential weighting criteria including weighting the data sample sets arriving late more than data sample sets arriving early.

11. The method of claim 10, wherein the selected signal is a signal strength indicator.

12. The method of claim 10, further including providing the filter coefficients by accessing a table.

13. The method of claim 10, further including computing the filter coefficients.

14. For use in a communication system, an arrangement for filtering a stream of data samples arriving at irregular intervals, comprising:

means for providing a relative arrival time of data sample sets in the stream of data samples;

means, responsive to providing the relative arrival time, for filtering the data sample sets using value assignments that are exponentially weighted for the data sample sets, the data sample sets being weighted more than data sample sets arriving early.

15. The arrangement of claim 14, wherein each of the data sample sets is composed of a single data sample.

16. The arrangement of claim 14, wherein the filtering includes modifications of IIR filtering with the value assignments being weighted as a function of one or more filter coefficients.

17. The arrangement of claim 14, wherein the filtering includes IIR filtering with the value assignments being weighted by a first weighting factor in response to determining that the data sample arrived not after a unit sample interval for the IIR filtering.

18. The arrangement of claim 17, wherein the filtering includes IIR filtering with the value assignments being weighted by a second weighting factor in response to determining that the data sample arrived after a unit sample interval for the IIR filtering.

19. For use in a communication system, an arrangement for filtering a stream of data samples arriving at irregular intervals, comprising:

a receiver including a digital signal processing arrangement configured and arranged to provide a relative arrival time of data sample sets in the stream of data samples, and, responsive to providing the relative arrival time, to filter the data sample sets using value assignments that are exponentially weighted for the data sample sets, the data sample sets being weighted more than data sample sets arriving early.

20. A communication system, comprising:

a mobile station including a receiver arrangement configured to filter a stream of data samples arriving at irregular intervals, to provide a relative arrival time of data sample sets in the stream of data samples, and in response to providing the relative arrival time, to filter the data sample sets using value assignments that are exponentially weighted for the data sample sets, the data sample sets being weighted more than data sample sets arriving early; and a plurality of base stations configured and arranged to communicate with the mobile station using CDMA.

21. The communication system of claim 20, wherein the receiver arrangement is further configured to search the data sample sets for a pilot signal and to filter the data sample sets based on time-arrival differences of consecutive starch results ensuing from the searching.

22. The communication system of claim 20, wherein the receiver arrangement further includes at least one digital signal processor programmed and arranged to perform despreading and integration and filtering on data samples for a plurality of different PN sequences.

23. In a communication system having a plurality of base stations configured and arranged to communicate with mobile stations using CDMA, a mobile station comprising:

a receiver front end;

a receiver arrangement responsive to the receiver front end and configured to filter a stream of data samples arriving at irregular intervals, to provide a relative arrival time of data sample sets in the stream of data samples, and in response to providing the relative arrival time, to filter the data sample sets using value assignments that are exponentially weighted for the data sample sets, the data sample sets being weighted more than data sample sets arriving early.

* * * * *